United States Patent
Tsai et al.

(10) Patent No.: US 8,427,041 B2
(45) Date of Patent: Apr. 23, 2013

(54) WARM WHITE LED AND ITS LUTETIUM-BASED PHOSPHOR

(76) Inventors: Chi-Ruei Tsai, Taipei (TW); Kun-Lin Chang, Sanchong (TW); Chen-Pei Hsu, Sanchong (TW); Wen-Sheng Huang, Sanchong (TW)

(*) Notice: Subject to any disclaimer, the term of this patent is extended or adjusted under 35 U.S.C. 154(b) by 203 days.

(21) Appl. No.: 12/986,126

(22) Filed: Jan. 6, 2011

(65) Prior Publication Data
US 2011/0298358 A1 Dec. 8, 2011

(30) Foreign Application Priority Data
Jun. 3, 2010 (TW) .................. 99117887 A

(51) Int. Cl.
*H01J 1/62* (2006.01)
(52) U.S. Cl.
USPC ............. 313/486; 313/485; 257/678

(58) Field of Classification Search .......... 313/485; 257/678, E31.118, E31.119
See application file for complete search history.

(56) References Cited

U.S. PATENT DOCUMENTS

| | | | |
|---|---|---|---|
| 2004/0256974 A1* | 12/2004 | Mueller-Mach et al. | 313/485 |
| 2006/0102991 A1* | 5/2006 | Sakano | 257/678 |

\* cited by examiner

*Primary Examiner* — Mary Ellen Bowman
(74) *Attorney, Agent, or Firm* — Guice Patents PLLC

(57) ABSTRACT

A lutetium-based phosphor having the chemical formula: $xLu_3Al_5O_{12} \cdot yGd_3Al_5O_{12}:CePrEuTb$, and being capable of radiating reddish orange-red spectrum when activated by a shortwave light emitted by an InGaN light-emitting diode. The invention also discloses a warm white LED using the lutetium-based phosphor that produces orange-red light having the peak wavelength $\lambda_{max} > 560$ nm, half width $> 125$ nm and color rendering index $Ra \geq 75$ when activated by the LED radiation $\lambda = 420 \sim 500$ nm.

9 Claims, 5 Drawing Sheets

WARM WHITE LED AND ITS LUTETIUM-BASED PHOSPHOR

BACKGROUND OF THE INVENTION

1. Field of the Invention

The present invention relates to warm white LED technology and more particularly, to an InGaN substrate-based warm white LED comprising a great number of nanograde lutetium-based phosphor.

2. Description of the Related Art

US engineers H. Yooder and M. Kettle firstly introduced a synthetic crystalline material of the garnet group containing $Y_3Al_5O_{12}$, and gave the material the name of Yttrium aluminum garnet (YAG).

Yooder teaches the structural space composition of the synthetic crystalline material to be a J103d synthetic garnet of which the lattice parameter a=12.01±0.2 Å is greater than natural garnet a≈11.86 Å. Large size $Y^{+3}$ and $Mn^{+3}$ were used together in the material. This material has the chemical formula $A_3B_2(BO_4)_3$, in which A type ions (rare earth elements, such as calcium, iron, etc.) have a dodecahedral coordination with the coordination number $K_u$=8; B type ions (silicon and partial aluminum) have the coordination number $K_u$=4; a part of $Al^{+3}$ ions have an octahedral structure with coordination number $K_u$=6.

Ever since a long time ago, people's attention is focused on the beautiful ruby. Yooder opened the door of synthesis and created a new technology of industrial crystallization. This technological concept was developed in 20$^{th}$ Century and joined with laser technology for application.

U.S. Pat. No. 3,882,215 and CA900620A disclosed phosphor-contained light emitting diodes based on GaP—GaAs to radiate in the infrared spectrum, enabling the invisible infrared radiation to be converted into visible red light, green light or blue light by means of an Anti-Stokes phosphor.

In 1994, Japanese physicist S. Nakamura introduced the use of a Stokes phosphor in GaN semiconductor architecture (see S. Nakamura Blue laser Sringer-Verlar Berlin 1997) to enhance the performance. Shortly thereafter, in 1995, a Nichia's physicist introduced a white light LED using a wideband phosphor $Y_3Al_5O_{12}$:Ce (see U.S. Pat. No. 3,564,322, GB 1174518, DE1764218 and Be714420) and a light-emitting diode synthetic structure (U.S. Pat. No. 3,564,322, GB 1174518, DE1764218 and Be714420). The concept is based on the theory of color developed by Isaac Newton (1642~1727) to create white radiation by means of combining two complementary colors. In the well-known patent N5988925, there are many drawbacks as follows: 1. The luminous efficacy of the light-emitting diode is low, or about 10~12 lumen/watt when the color temperature is over 5000K; 2. InGaN light-emitting diode's blue radiation produce adverse effects to vision; and 3. It is difficult to duplicate warm white light by using a solid $(Y,Gd,Ce)_3Al_5O_{12}$ substrate-based single-component material.

Due to lack in single-component garnet structure-based light-emitting material, development of warm white light-emitting diode is limited. Using a single-component $(Gd,Ce)_3Al_5O_{12}$ to construct a similar light-emitting diode has not yet been confirmed. Further, series of researches with the use of single-component phosphor $Gd_3Al_5O_{12}$ were denied by Aedred F. A (Aedred F. A Trans Brit Ceram Soc. 1959. vol 58N4p 199-210).

Using $Y_3Al_5O_{12}$:Ce and $CaAlSiN_3$:Eu two-component phosphor to make a warm red light-emitting diode has been disclosed (US2008283801A, Nov. 20, 2008 and Soshchin N's CN 2008 1016492, Nov. 5, 2008). In these disclosures, many garnet structures are introduced for obtaining warm white light. Along these disclosures, CN 20081016492 is likely to be deemed relevant to the field of the invention.

SUMMARY OF THE INVENTION

It is the main object of the present invention to provide a warm white LED using a lutetium-based phosphor, which has a high luminous efficacy in a shortwave InGaN LED structure, providing reddish orange-red radiation in the area $\lambda_{max}$>560 nm.

It is another object of the present invention to provide a warm white LED using a lutetium-based phosphor, which creates a wideband radiation and has a high color rendering index (CRI or Ra).

It is still another object of the present invention to provide a lutetium-based phosphor, which is practical for use in a warm white light-emitting diode.

To achieve these and other objects of the present invention, a lutetium-based phosphor has the chemical formula: $xLu_3Al_5O_{12} \cdot yGd_3Al_5O_{12}$:CePrEuTb, and can radiate reddish orange-red spectrum when activated by a shortwave light emitted by an InGaN light-emitting diode.

To achieve these and other objects of the present invention, a warm white LED comprises an InGaN LED, and a LED light conversion layer located on the top side of the InGaN LED to convert the primary blue radiation of the InGaN LED into warm white light.

DETAILED DESCRIPTION OF THE PREFERRED EMBODIMENT

Figure 1:
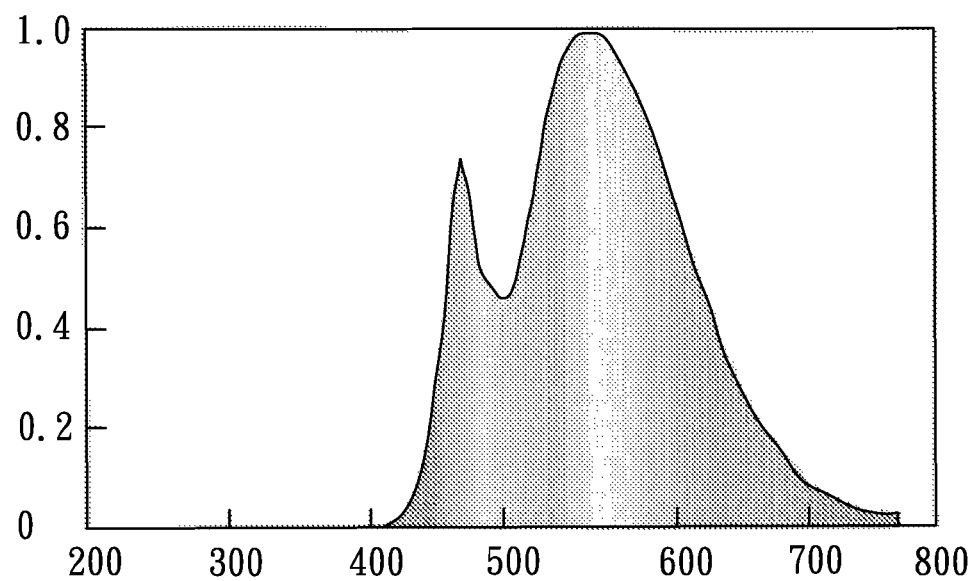
FIG. 1 is a schematic spectrum diagram obtained from Sample 1 shown in Table I in accordance with the present invention.

The invention provides a lutetium-based phosphor, which has the chemical formula: $xLu_3Al_5O_{12} \cdot yGd_3Al_5O_{12}$:CePrEuTb, and can radiate reddish orange-red spectrum when activated by a shortwave light emitted by an InGaN light-emitting diode;

wherein the values of the parameters in the chemical formula are: x+y=1; 0<x<1;

wherein the peak wavelength in the reddish orange-red area is $\lambda_{max} \geq 560$ nm;

wherein the atomic fraction ratio between lutetium (Lu) and gadolinium (Gd) is within 20:1~1:20, preferably 1:1~1:10; atomic fractions of activators are: $[Ce^{+3}]$=0.005~0.08, $[Pr^{+3}]$=0.0005~0.015 and $[Eu^{+3}]$=0.0001~0.01;

wherein the maximum radiation spectrum of Lu/Gd≈1:4 in the phosphor is at $\lambda_{max}$=583 nm;

wherein when chromaticity coordinates are Σ(x+y)>0.78, the radiation wavelength is λ=560~590 nm;

wherein the activation spectrum of the phosphor is in the range of λ=420~500 nm subject to change of content between lutetium (Lu) and gadolinium (Gd);

wherein the half width of the spectrum of the maximum radiation of the phosphor is at $\lambda_{0.5}$=125~135 nm;

wherein the phosphor is prepared in the form of ultradispersed particles in an oval shape, having a mid-diameter $d_{50} \leq 2$ m.

The solutions provided by the present invention are described below. First of all, it is to be understood that: 1. The phosphor does not belong to YAG phosphor group lacking in yttrium; 2. $Lu^{+3}$ is partially substituted by $Gd^{+3}$; and 3. The phosphor uses $Ce^{+3}$ as activator that has the concentration of 0.08 atomic fraction, assuring absorption of shortwave radiation of InGaN material at λ>420 nm and distribution of light emission in the visible spectra of blue, green, orange and red with the maximum spectrum $\lambda_{max} \geq 560$ nm.

Because the phosphor composite provided by the present invention lacks in $Y^{+3}$, the radiation luminescence of the garnet structure has the characteristics of: 1. wide spectral radiation λ=500~800 nm or more; 2. wide half-width>125 nm; 3. short afterglow, shorter than 100 ns; 4. high quantum radiation output η>0.90; and 5. the shift of the major sub-band has a great concern with the major excitation band.

The luminous performance of the phosphor provided by the present invention commonly is based on the activator of $Ce^{+3}$. Based on the activator of $Ce^{+3}$, the major radiation is warm white light, spectral radiation of cerium composition disperses in different broad-bands.

The major $Ce^{+3}$ radiation excitation band, according to Gaussian curve, is symmetric relative to vertical major axis.

$Ce^{+3}$ has the internal marks of $^2F_{5/2}$ and $^2F_{7/2}$ (activation level), $^2D_{5/2}$ and $^2D_{3/2}$ (basic status). When raising the lattice electrostatic field of the phosphor, $Ce^{+3}$ radiation will shift toward the short wavelengths. Relatively, when lowering the lattice electrostatic field, $Ce^{+3}$ radiation will shift toward the long wavelengths.

To facilitate explanation of the optical effects of substitution structures, a spectrum analysis is employed. The phosphor radiation spectral data was obtained subject to the use of a professional measurement analyzer from a "Sensing company" to scan visible spectrum area under λ=380~780 nm at internal 5 nm under a blue LED light source radiation at λ=464 nm. The composition of the phosphor in accordance with the present invention and its optical properties are indicated in the following Table 1.

TABLE 1

| Sample | Phosphor | $\lambda_{max}$ nm | $\lambda_{0.5}$ nm | cd/m² | K |
|---|---|---|---|---|---|
| 1 | $(Y_{0.8}Gd_{0.2})_3Al_5O_{12}$:Ce3% | 560 | 120 | 25480 | 5500 |
| 2 | $0.25Lu_3Al_5O_{12} \cdot 0.75Gd_3Al_5O_{12}$:Ce5% | 572 | 132 | 20730 | 3485 |
| 3 | $0.2Lu_3Al_5O_{12} \cdot 0.8Gd_3Al_5O_{12}$:Ce8% | 583 | 135 | 21040 | 3431 |
| 4 | $0.3Lu_3Al_5O_{12} \cdot 0.7Gd_3Al_5O_{12}$:Ce3% Pr0.1% | 609 | 131 | 20471 | 3431 |
| 5 | $0.3Lu_3Al_5O_{12} \cdot 0.7Gd_3Al_5O_{12}$:Ce5% Pr0.2% | 610 | 128 | 20754 | 3279 |

FIGS. 1~5 illustrate 5 different alternate forms of the lutetium-based phosphor in accordance with the present invention.

As illustrated in FIG. 1, the parameter coordinates of the phosphor Sample 1 in Table 1 are as follows:

Chromaticity coordinates: x=0.3837 y=0.4399, u=0.2043 y=0.3514, Correlated color temperature: 5500K, Brightness: 25480, Radiant Brightness: 69.943, Peak wavelength: 560.4 nm, Bandwidth: 120 nm, Purity: 0.5310, Color ratio: Kr=42.8% Kg=33.5% Kb=23.6%, Rendering index: Ra=70.1 R1=64 R2=80 R3=95 R4=57 R5=62 R6=74 R7=80 R8=48 R9=−40 R10=56 R11=50 R12=38 R13=69 R14=96 R15=54.

Figure 2:
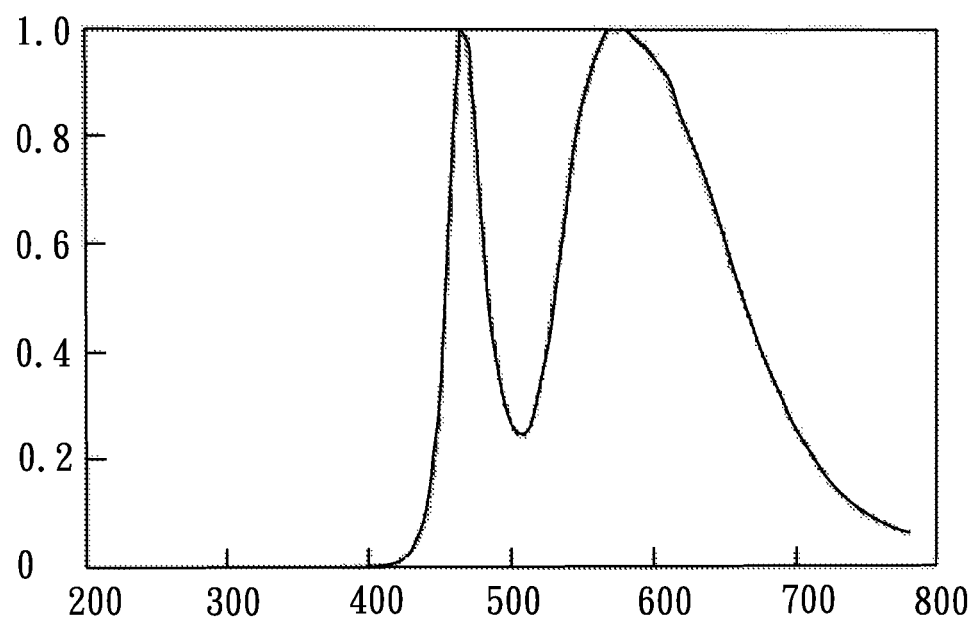
FIG. 2 is a schematic spectrum diagram obtained from Sample 2 shown in Table I in accordance with the present invention.

As illustrated in FIG. 2, the parameter coordinates of the phosphor Sample 2 in Table 1 are as follows:

Chromaticity coordinates: x=0.4055 y=0.3895, u=0.2364 v=0.3405, Correlated color temperature: 3485K, Brightness: 20730, Radiant Brightness: 63.822, Peak wavelength: 571.8 nm, Bandwidth: 132 nm, Purity: 0.4509, Color ratio: Kr=53.2% Kg=25.2% Kb=21.5%, Rendering index: Ra=76.2 R1=74 R2=92 R3=93 R4=61 R5=71 R6=84 R7=78 R8=56 R9=5 R10=76 R11=49 R12=56 R13=78 R14=97 R15=72.

Figure 3:
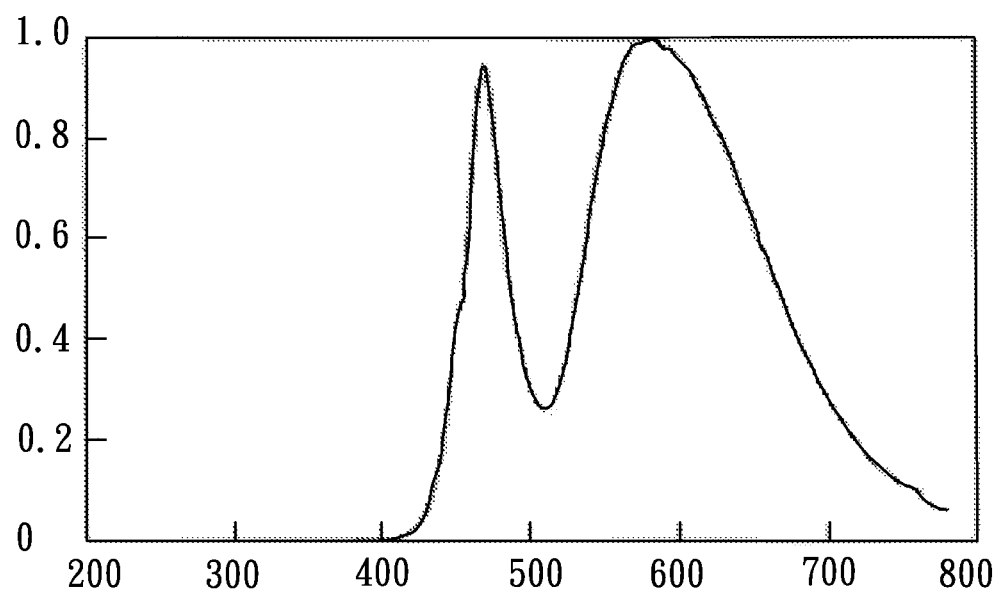
FIG. 3 is a schematic spectrum diagram obtained from Sample 3 shown in Table I in accordance with the present invention.
Figure 4:
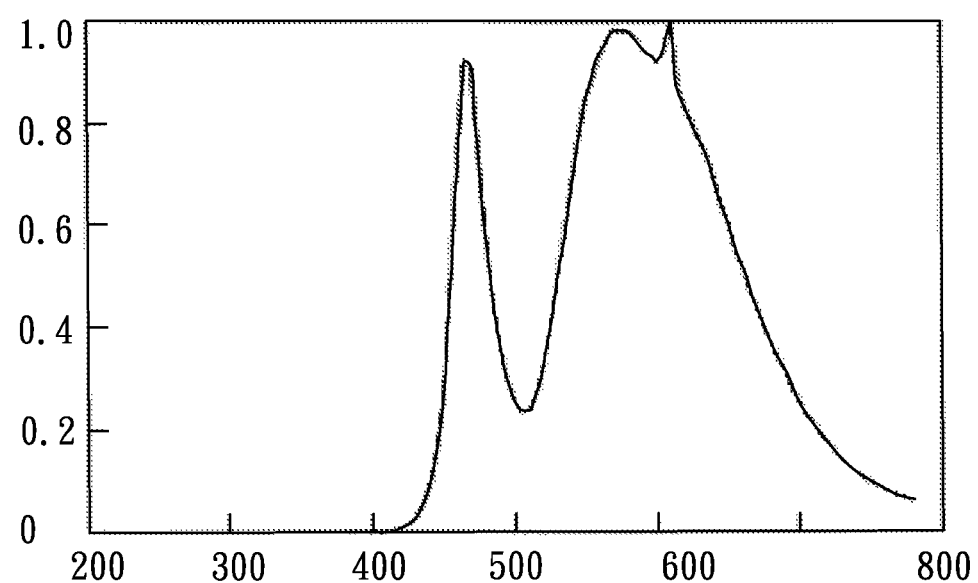
FIG. 4 is a schematic spectrum diagram obtained from Sample 4 shown in Table I in accordance with the present invention.

As illustrated in FIG. 3, the parameter coordinates of the phosphor Sample 3 in Table 1 are as follows:

Chromaticity coordinates x=0.4106 y=0.3940, u=0.2378 v=0.3423, Correlated color temperature: 3414K, Brightness: 20471, Radiant Brightness: 65.582, Peak wavelength: 609.1 nm, Bandwidth: 131 nm, Purity: 0.4763, Color ratio: Kr=53.9% Kg=25.5% Kb=20.6%, Rendering index: Ra=76.3 R1=74 R2=91 R3=94 R4=62 R5=70 R6=83 R7=79 R8=56 R9=4 R10=74 R11=50 R12=55 R13=78 R14=97 R15=72.

Figure 5:
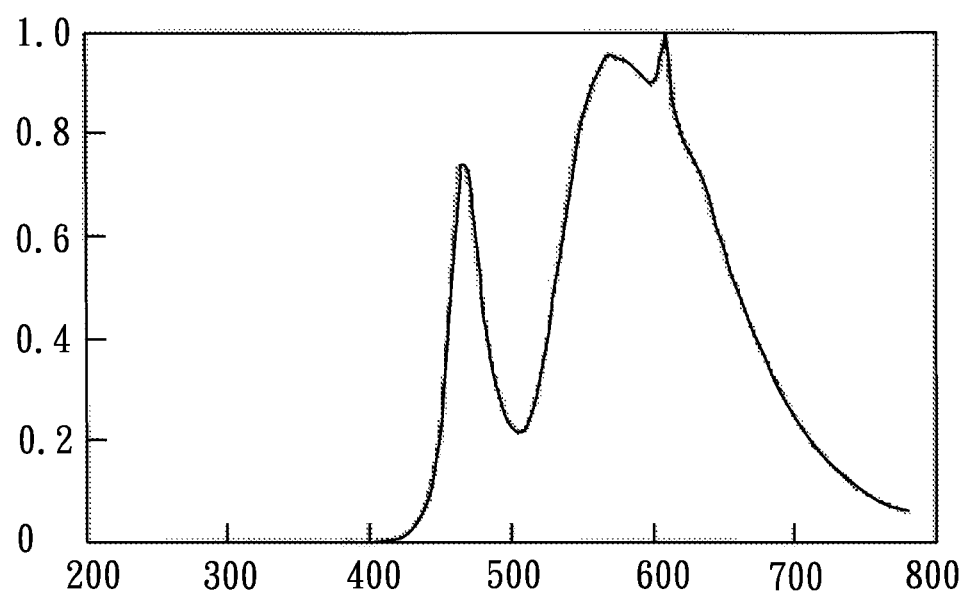
FIG. 5 is a schematic spectrum diagram obtained from Sample 5 shown in Table I in accordance with the present invention.

As illustrated in FIG. 5, the parameter coordinates of the phosphor Sample 5 in Table 1 are as follows:

Chromaticity coordinates x=0.4226 y=0.4070, u=0.2402 v=0.3469, Correlated color temperature: 3279K, Brightness: 20754, Radiant Brightness: 64.946, Peak wavelength: 609.8 nm, Bandwidth: 128 nm, Purity: 0.5445, Color ratio: Kr=55.6% Kg=26.3% Kb=18.1%, Rendering index: Ra=75.4 R1=71 R2=88 R3=95 R4=61 R5=67 R6=79 R7=80 R8=54 R9=−4 R10=67 R11=49 R12=49 R13=75 R14=97 R15=69.

Subject to the aforesaid Table 1, we can get the conclusions: 1. The higher the ratio of lutetium is the greater the peak wavelength of the phosphor will be, and the peak wavelength can be as great as $\lambda_{max}$=583 nm; 2. The full width half maximum can reach $\lambda_{1/2}$=135 nm; 3. The produced warm white color temperature can be controlled to about 3500K; and 4. The color temperature can be reduced to 3280K when a minor amount of activator Pr (Praseodymium) is added to the phosphor.

The phosphor of the present invention is characterized by: the atomic fraction ratio between lutetium (Lu) and gadolinium (Gd) is within 20:1~1:20, preferably 1:1~1:10; $Ce^{+3}$ is used as an activator at the ratio of: 0.005~0.08 atomic fraction.

In the compositions of the phosphor samples in Table 1, Sample 3 indicates the atomic fraction ratio between lutetium (Lu) and gadolinium (Gd) in the phosphor to be Lu/Gd=1:4 with the maximum spectrum $\lambda_{max}$=583 nm.

$Ce^{+3}$ spectral radiation substantial difference comes from the radiation of other rare earth ions, such as $Tb^{+3}$, $Eu^{+3}$ or $Pr^{+3}$, and the internal ions in the f-track inter-constrain with the surface, normally $^5D_J$-$^7F_J$. $Ce^{+3}$ in the 4f-5d track can radiate a wide visible light band.

Containing strong absorbed light, ion activation returns to the former initial status, and released quantum luminescence shows a difference $\Delta \approx 60$~70 nm, therefore the maximum radiating spectrum of $Ce^{+3}$ is at the garnet sub-band 530~590 nm. Radiation transition occurs in that containing the total $Ce^{+3}$, and the maximum radiation in the cubic structure $Gd_3Al_5O_{12}$ is at $\lambda_{max}$=580~585 nm, in the orange-red visible spectrum area.

Further, the invention also proposed that when color coordinate values reaches $(\Sigma x+y)>0.78$, the radiation of the major wavelength is $\lambda$=560~585 nm, the maximum values of different radiation spectra are symmetric relative to the radiation of the major spectrum.

It is a main advantage of the present invention that the phosphor has a characteristic of color rendering index $Ra \geqq 75$.

Further, the invention also provides a warm white LED, which comprises an InGaN LED (not shown), and a light conversion layer located on the top side of the InGaN LED and adapted for converting the primary blue radiation of the InGaN LED into warm white light; wherein the light conversion layer comprises a lutetium-based phosphor having the chemical formula of $xLu_3Al_5O_{12}.yGd_3Al_5O_{12}$: CePrEuTb and is joined with an organic silicon polymer and evenly distributed over the radiating surface and facets of the InGaN LED; wherein x+y=1 and 0<x<1; wherein the weight ratio of the phosphor particles can be, but is not limited to, 15~50%; wherein the primary blue radiation has the wavelength of $\lambda$=420~500 nm, and the phosphor produces an orange-red light of wavelength $\lambda_{max} \geqq$=560 nm, when activated by the primary blue radiation $\lambda$=420~500 nm, which has a half width>125 nm, color rendering index is $Ra \geqq 75$, a color temperature is T=2500~4500K and the color coordinates are $x \geqq 0.4$ and $y \geqq 0.37$.

The particles of the phosphor prepared in accordance with the present invention show an oval shape, having a mid-diameter $d_{50}$=2.00±0.5 μm. If $d_{50}$>2.50 μm, the particles will not be compact and will have a big amount of blind holes. If $d_{50}$<2 μm, light scattering will be increased, and the luminous brightness will be reduced when the LED radiation is activated at the first time.

In conclusion, the average particle size is $d_{50}$=2.00±0.5 μm. The phosphor prepared according to the present invention has a high luminous brightness. Because few literatures of gadolinium garnet phosphor were available, a solid solution of $(Y_{0.8}Gd_{0.2})_3Al_5O_{12}$:Ce3% phosphor was used as a reference for comparison.

According to its chemical composition (Lu/Gd correlation), we obtained phosphor samples of luminous brightness over 80% and peak wavelength $\lambda_{max}$>560 nm, having the major luminance in the visible spectra area. Further, the invention also discloses a warm white LED using a lutetium-based phosphor. The lutetium-based phosphor is as illustrated in Table 1.

This warm white LED structure is similar to China Patent CN101104802A (for the detail, please refer to its specification and drawings). The LED heterostructure (P-N junction) which is arranged on a thermally conductive sapphire or mono-silicon substrate and having filled therein a light conversion layer is generally positioned in a conical optical storage that guides gathered light toward the LED lens cover for outward radiation. The light conversion layer is a compound of lutetium-based phosphor particles and a polymer and covered on the surface or facets of the light-emitting diode. In conventional LEDs, the refractive index of silicate (organic silicon) composite can reach n=1.65~1.75. This high refractive index greatly enhances the radiation output of the light conversion layer. With respect to the components of the aforesaid light-emitting diode, thermally conductive substrate, optical storage, light conversion layer and lens cover, please refer to the specification and drawings in the aforesaid CN101104802A.

The warm white LED using a lutetium-based phosphor in accordance with the present invention is based on a nitride light-emitting diode that has a 160~200 μm light conversion layer covered on the light-emitting surface and lateral surfaces thereof. The evenly distributed thickness of the light conversion layer ensures a high uniform light and color. The weight ratio of phosphor particles in the polymer in a range from 3% to 70% were tried. When the weight ratio of phosphor particles in the polymer was at 3%, the color temperature was as high as T>10000K. When the weight ratio of phosphor particles in the polymer was increased, the luminous radiation became the color tone of orange-yellow. The most preferable weight ratio of the phosphor particles in the polymer is 15~50%, assuring a high luminous brightness and high color rendering index.

The warm white LED using a lutetium-based phosphor in accordance with the present invention is characterized in that the nitride LED-based light conversion layer converts the primary blue radiation into warm white light, wherein the light conversion layer is prepared by mixing the aforesaid garnet phosphor particle element with organic silicon polymer and evenly covered on the radiating surface and facets of the light-emitting diode, and the weight ration of the phosphor particles is within 6~70%.

It was observed that the lutetium-based phosphor of the warm white LED produces a relatively longer wavelength radiation when activated by the shortwave radiation of the light-emitting diode of the warm white LED. When compared with the reference garnet phosphor ($\lambda$=450~465nm), the activated wavelength of the lutetium-based phosphor is $\lambda$=420~500 nm. The reference garnet phosphor $(Y_{0.8}Gd_{0.2})_3Al_5O_{12}$:Ce3% does not provide such broad activated wavelength.

This high-brightness LED emits a high-saturated color and provides a high quantum output of color temperature in a range of 2500~4500K and warm white color coordinates $x \geqq 0.4$, $y \geqq 0.37$.

The aforesaid warm white LED using a lutetium-based phosphor in accordance with the present invention further comprises a semispherical lens (not shown) cover located on the top side of the light conversion layer. The semispherical lens cover exhibits luminous intensity I>5000 mcd, power W=1 and luminous flux F=80~90 lumens at the radiation viewing angle 2θ=60°.

A LED with Gd—Lu—Ce-based phosphor prepared in accordance with the present invention has the advantage of increasing the luminous flux to F>150 lumens when power W=1~2 watt and having the luminous efficacy $\eta \geqq 75$ lumen/watt.

Subject to the invention of the warm white LED and its lutetium-based phosphor, the invention creates a high-performance electroluminescent material in the field of shortwave InGaN light-emitting diode structure. The most important feature of the present invention is the orange-red radiation in the area of $\lambda_{max}$>560 nm, establishing a wideband radiation with a high color rendering index (Ra) value to improve the drawbacks of the prior art warm white LEDs and garnet phosphors.

Although particular embodiments of the invention have been described in detail for purposes of illustration, various modifications and enhancements may be made without departing from the spirit and scope of the invention.

What is claimed is:

1. A lutetium-based phosphor comprising:
a chemical formula: $xLu_3Al_5O_{12} \cdot yGd_3Al_5O_{12}$:CePrEuTb, and being capable of radiating an orange-red spectrum when activated by a shortwave light emitted by an InGaN light-emitting diode, the lutetium-based phosphor includes at least one activator, wherein $x+y=1$ and $0<x<1$.

2. The lutetium-based phosphor as claimed in claim 1, wherein a peak wavelength in said orange-red spectrum is $\lambda_{max}560$ nm.

3. The lutetium-based phosphor as claimed in claim 1, wherein an atomic fraction ratio between lutetium (Lu) and gadolinium (Gd) is in a range between 20:1 and 1:20; atomic fractions of activators are: $[Ce^{+3}]$ is in a range from 0.005 to 0.08, $[Pr^{+3}]$ in a range from 0.0005 to 0.015 and $[Eu^{+3}]$ is in a range from 0.0001 to 0.01.

4. The lutetium-based phosphor as claimed in claim 1, wherein the maximum radiation spectrum of Lu/Gd≈1:4 in the lutetium-based phosphor is at $\lambda_{max}=583$ nm; when chromaticity coordinates are $\Sigma(x+y)>0.78$, a radiation wavelength is in a range from $\lambda=560$ to $\lambda=590$ nm; an activation spectrum of the lutetium-based phosphor is in a range from $\lambda=420$ to $\lambda=500$ nm; a half width of a spectrum of a maximum radiation of the lutetium-based phosphor is in a range from $\lambda_{0.5}=125$ to $\lambda_{0.5}=135$ nm.

5. The lutetium-based phosphor as claimed in claim 1, wherein the lutetium-based phosphor has ultradispersed particles in an oval shape and having a mid-diameter $d_{50} \leqq 2$ m.

6. A warm white light-emitting diode comprising: an InGaN light-emitting diode, and a light conversion layer located on a top side of said InGaN light-emitting diode and adapted for converting a primary blue radiation of said InGaN light-emitting diode into warm white light, wherein said light conversion layer comprising a lutetium-based phosphor having a chemical formula of $xLu_3Al_5O_{12} \cdot yGd_3Al_5O_{12}$:CePrEuTb and is joined with an organic silicon polymer and evenly distributed over a radiating surface and facets of said InGaN light-emitting diode, the lutetium-based phosphor includes at least one activator, wherein $x+y=1$ and $0<x<1$.

7. The warm white light-emitting diode as claimed in claim 6, wherein a weight ration of the phosphor particles is in a range from 15% to 50%.

8. The warm white light-emitting diode as claimed in claim 6, wherein said primary blue radiation has a wavelength in a range from $\lambda=420$ to $\lambda=500$ nm; said phosphor produces a orange-red light at $\lambda_{max}>560$ nm, when activated by said primary blue radiation of wavelength in a range from $\lambda=420$ to $\lambda=500$ nm, which has a half width>125 nm, a color rendering index Ra$\geqq$75, a color temperature in a range from T=2500 to T=4500K and color coordinates x$\geqq$0.4 and y$\geqq$0.37.

9. The warm white light-emitting diode as claimed in claim 6, further comprising a lens cover having a semispherical shape and being located on a top side of said light conversion layer, said lens cover exhibiting luminous intensity I>5000 mcd, power W=1 and luminous flux in a range from F=80 to F=90 lumens at the radiation viewing angle $2\theta=60°$.

* * * * *